United States Patent
Siddiqui et al.

(10) Patent No.: US 8,482,622 B2
(45) Date of Patent: Jul. 9, 2013

(54) METHOD, SYSTEM AND COMPUTER PROGRAM PRODUCT FOR REDUCING MOTION BLUR

(75) Inventors: Muhammad Siddiqui, Esslingen (DE);
Haroon Farooq Qureshi, Linz (AT);
Klaus Zimmermann, Deizisau (DE)

(73) Assignee: Sony Corporation, Tokyo (JP)

( * ) Notice: Subject to any disclaimer, the term of this patent is extended or adjusted under 35 U.S.C. 154(b) by 366 days.

(21) Appl. No.: 12/838,853

(22) Filed: Jul. 19, 2010

(65) Prior Publication Data

US 2011/0050920 A1    Mar. 3, 2011

(30) Foreign Application Priority Data

Aug. 27, 2009    (EP) .................................... 09168813

(51) Int. Cl.
*H04N 5/228* (2006.01)
*H04N 5/225* (2006.01)

(52) U.S. Cl.
USPC ................................ 348/208.99; 348/207.99

(58) Field of Classification Search
USPC ..................... 348/208.99, 208.1, 208.2, 208.6
See application file for complete search history.

(56) References Cited

U.S. PATENT DOCUMENTS

| 8,098,948 | B1 * | 1/2012 | Tzur et al. ..................... 382/255 |
| 2007/0258707 | A1 * | 11/2007 | Raskar .............................. 396/52 |
| 2007/0296833 | A1 * | 12/2007 | Corcoran et al. ........ 348/231.99 |
| 2008/0266413 | A1 * | 10/2008 | Cohen et al. ............... 348/222.1 |
| 2010/0246989 | A1 * | 9/2010 | Agrawal et al. ............... 382/255 |

OTHER PUBLICATIONS

U.S. Appl. No. 12/893,677, filed Sep. 29, 2010, Lei, et al.
Ramesh Raskar et al., "Coded Exposure Photography: Motion Deblurring using Fluttered Shutter", Trans. Graph., 25(3): 795-804, 2006, 10 pages.
Amit Agrawal et al., "Coded Exposure Deblurring: Optimized Codes for PSF Estimation and Invertibility", CVPR, Jun. 20-25, 2009, 8 pages.

\* cited by examiner

*Primary Examiner* — Trung Diep
(74) *Attorney, Agent, or Firm* — Oblon, Spivak, McClelland, Maier & Neustadt, L.L.P.

(57) ABSTRACT

The present invention relates to a method for reducing motion blur. According to the method, at least two image frames are captured. A sequence of values is provided. All captured frames are processed by subsequently associating one sequence value with each captured frame. The processed captured frames are accumulated and a deconvolution is applied to the accumulated frame.
The present invention further relates to system for reducing motion blur.

29 Claims, 6 Drawing Sheets

- Prior Art -

- Prior Art -

- Prior Art -

METHOD, SYSTEM AND COMPUTER PROGRAM PRODUCT FOR REDUCING MOTION BLUR

FIELD OF INVENTION

The present invention relates to the field of coded exposure photography. More specifically, the present invention relates to a method for reducing motion blur in image data, to a computer program product for performing the steps of the method, to a system for reducing motion blur in image data, and to an imaging device comprising a system for reducing motion blur.

BACKGROUND OF THE INVENTION

When an image is captured by a camera, the image does not represent a single instant of time but it represents the scene over a period of time. So any object moving with respect to the camera after the convolution with PSF (point spread function), e.g. box filter or broadband filter, the image will be blurred. Motion blur can happen due to unsteady hand movement or object motion while capturing the image and the image will be smeared along the direction of relative motion.

Motion blur can be handled in three different ways
1. Short Exposure Time Imaging
2. Image Deblurring using Conventional Camera Approach
3. Image Deblurring using Flutter Shutter Approach In the case of short exposure time imaging each individual frame can be noisy. The lower the exposure time, the lower the number of photons that reach the sensor, hence the captured image is noisier. The color tone is also lost since not enough light is captured by the sensor.

In the case of the second above-mentioned deblurring approach using conventional camera, high spatial frequencies are lost because of the box-shaped nature of the camera exposure pattern as shown in FIG. 1. In FIG. 1 a diagram is shown having the time on the x-axis and the indication of opening and closing the shutter on the y-axis.

When an image convolves with such kind of response it smears the high frequencies contents.

So in case of a band limited response, the PSF coverage of the Fourier domain is incomplete and information is lost. Therefore a flat blur and motion blurring occurs resulting in a continuous smear. This is explained in more detail with reference to FIG. 2. FIG. 2 shows the Fourier spectrum of a PSF. In the x-axis the normalized frequency is shown and on the y-axis the magnitude in dB. As can be seen, the Fourier spectrum contains several zeros indicated with 30 in its spectrum. In that case the Fourier spectrum of PSF contains zeros in its spectrum as shown in FIG. 2, the inverse filtering will amplify noise and produce ringing artifacts and make the deconvolution an ill-posed problem.

Now the third above-mentioned possibility of deblurring using the flutter shutter approach will be explained. Such an approach is described in document R. Raskar et al. "Coded Exposure Photography: Motion Deblurring using Fluttered Shutter", which is incorporated herein by reference. The shutter is opening and closing over a single exposure time according to a random binary coded sequence as for example described in document A. Agrawal et al. "Coded Exposure Deblurring: Optimized Codes for PSF Estimation and Invertibility". The sequence is chosen so that the resulting motion blur PSF has a flat frequency spectrum and high spatial frequencies are preserved. A block diagram of this system is shown in FIG. 3.

The system 100 comprises a coded exposure camera 101, which takes several frames using the flutter shutter approach. The blurred image 111 is then submitted to a PSF estimation unit 103. Information 120 received by user interaction is also submitted to the PSF estimation unit 103, which determined the PSF. This information 113 is then submitted to the deconvolution unit 105, which carries out deconvolution and the final deblurred image 115 is output.

SUMMARY OF INVENTION

It is therefore the objective problem of the present invention to improve the prior art. More specifically, it is the object of the present invention to reduce the problems posed by prior art.

According to one aspect the present invention relates to a method for reducing motion blur comprising the steps of
capturing at least two image frames,
providing a sequence of values,
processing each captured frame by subsequently associating one sequence value to each captured frame,
accumulating all captured processed frames, and
applying a deconvolution to the accumulated frame.

According to still a further aspect the present invention relates to a computer readable non-transitory medium having instructions stored thereon which, when carried out on a computer, cause the computer to perform the steps of the method according to the present invention.

According to a further aspect the present invention relates to a system for reducing motion blur, comprising
a frame capturer for capturing at least two image frames,
a sequence provider for providing a sequence of values,
a frame processor for processing each captured frame by subsequently associating one sequence value to each captured frame,
a frame accumulator for accumulating all captured processed frames, and
a deconvolution unit for applying a deconvolution to the accumulated frame.

According to a further aspect the present invention relates to a system for reducing motion blur, comprising
means for capturing at least two image frames,
means for providing a sequence of values,
means for processing each captured frame by subsequently associating one sequence value to each captured frame,
means for accumulating all captured processed frames, and
means for applying a deconvolution to the accumulated frame.

The present invention relates particularly to a device, preferably a still camera having burst shot mode or a video camera, comprising any such system proposed by the present invention.

According to still a further aspect the present invention relates to a computer program product stored on a computer readable medium which causes a computer to perform the steps of the method according to the present invention.

According to still a further aspect the present invention relates to a computer readable non-transitory medium having instructions stored thereon which, when carried out on a computer, cause the computer to perform the steps of the method according to the present invention.

Further features and advantages are set out in the dependent claims.

BRIEF DESCRIPTION OF DRAWINGS

The present invention will now be explained in more detail in the following description of the preferred embodiments in relation to the enclosed drawings in which.

DESCRIPTION OF PREFERRED EMBODIMENTS

Motion blur is a phenomenon that can happen in time domain while capturing an image normally. It occurs in case of moving object or camera motion or by camera handshake. So in order to compensate this motion blur, different approaches can be used. Deblurring a blurred image using conventional camera with band limited exposure time is itself an ill-posed problem. In this approach exposure time behaves like a temporal box filter so that when it convolves with an input image it smears the moving object and high spatial frequencies are lost in the blurred image. That makes the deblurring using conventional camera via deconvolution an ill posed problem but with the flutter shutter approach deconvolution becomes a well posed problem.

In flutter shutter approach instead of using constant exposure time the camera shutter is closed and opened during the entire exposure duration with a binary coded sequence thus it converts the box filter behavior to broad band filter which provides a way of retaining high spatial frequencies. That means the blurred image itself will retain the high frequencies values. One of the problems in this approach is the capturing of image according to the binary codes. For that purpose an external hardware or camera with a special trigger mode is needed and whose shutter can be controlled electronically i.e. without controlling the camera shutter and without triggering the camera, it is not possible to capture an image according to the coded sequence. For that reason, a trigger source/device is required. Estimation of PSF in between camera processing is very difficult. This is another problem in this method as this approach relies on user interaction to estimate PSF. PSF estimation is very important in order to recover image correctly. The third problem with this approach is that the coded sequence cannot be optimized according to the image contents.

The present invention therefore proposes a frame processing technique, where a part of the captured frames is dropped and/or weighted according to a predefined coded sequence. In the present invention the motion estimation can be used for the estimation of the PSF (Point Spread Function). The code defining the frame dropping/weighting can be optimized and an external hardware or special shutter time control camera is not required anymore. The present invention does retain the advantage of the coded exposure approach but simplifies the implementation.

Figure 1:
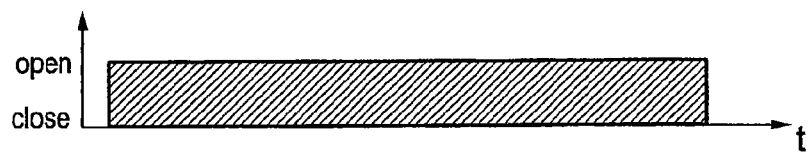
FIG. 1 shows a conventional exposure pattern.
Figure 2:
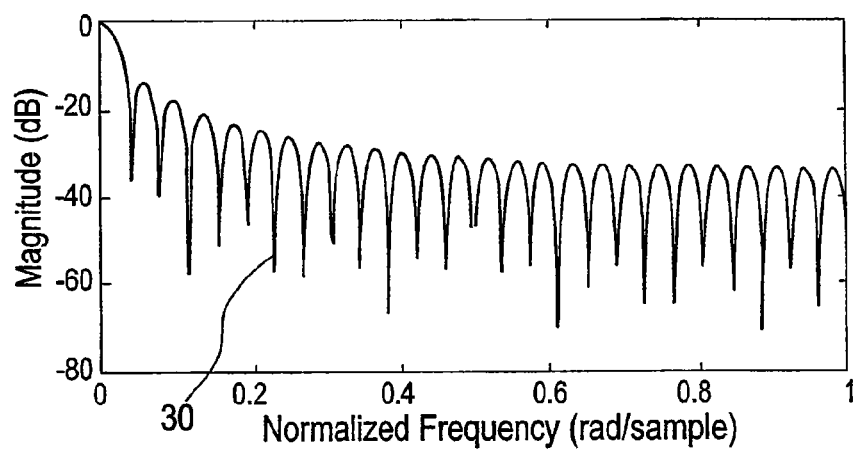
FIG. 2 shows a frequency spectrum of the PSF obtained with conventional techniques.
Figure 3:
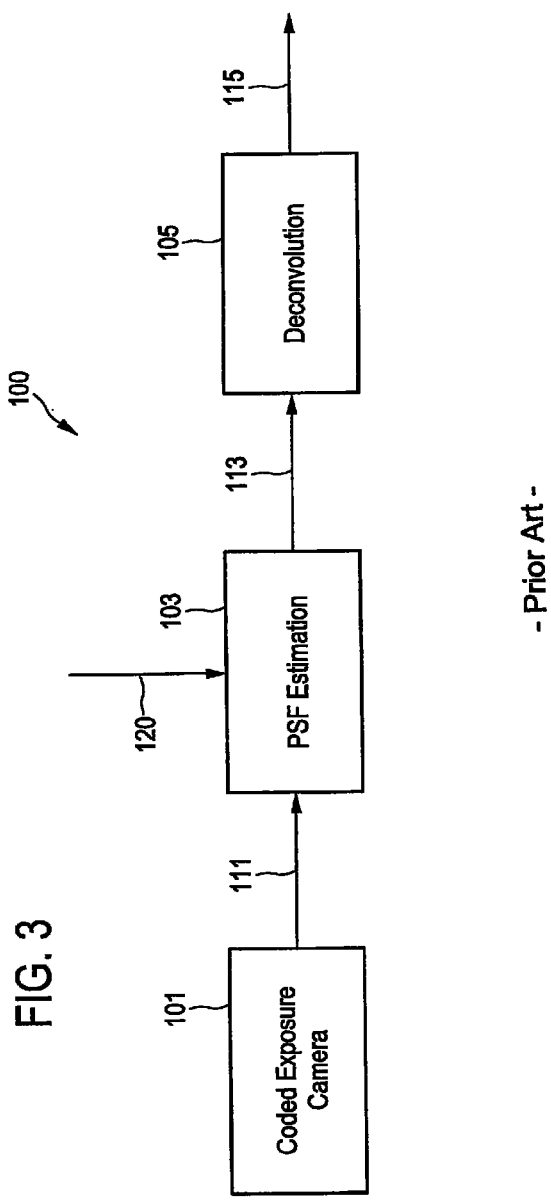
FIG. 3 shows a schematic block diagram of a system according to prior.
Figure 4:
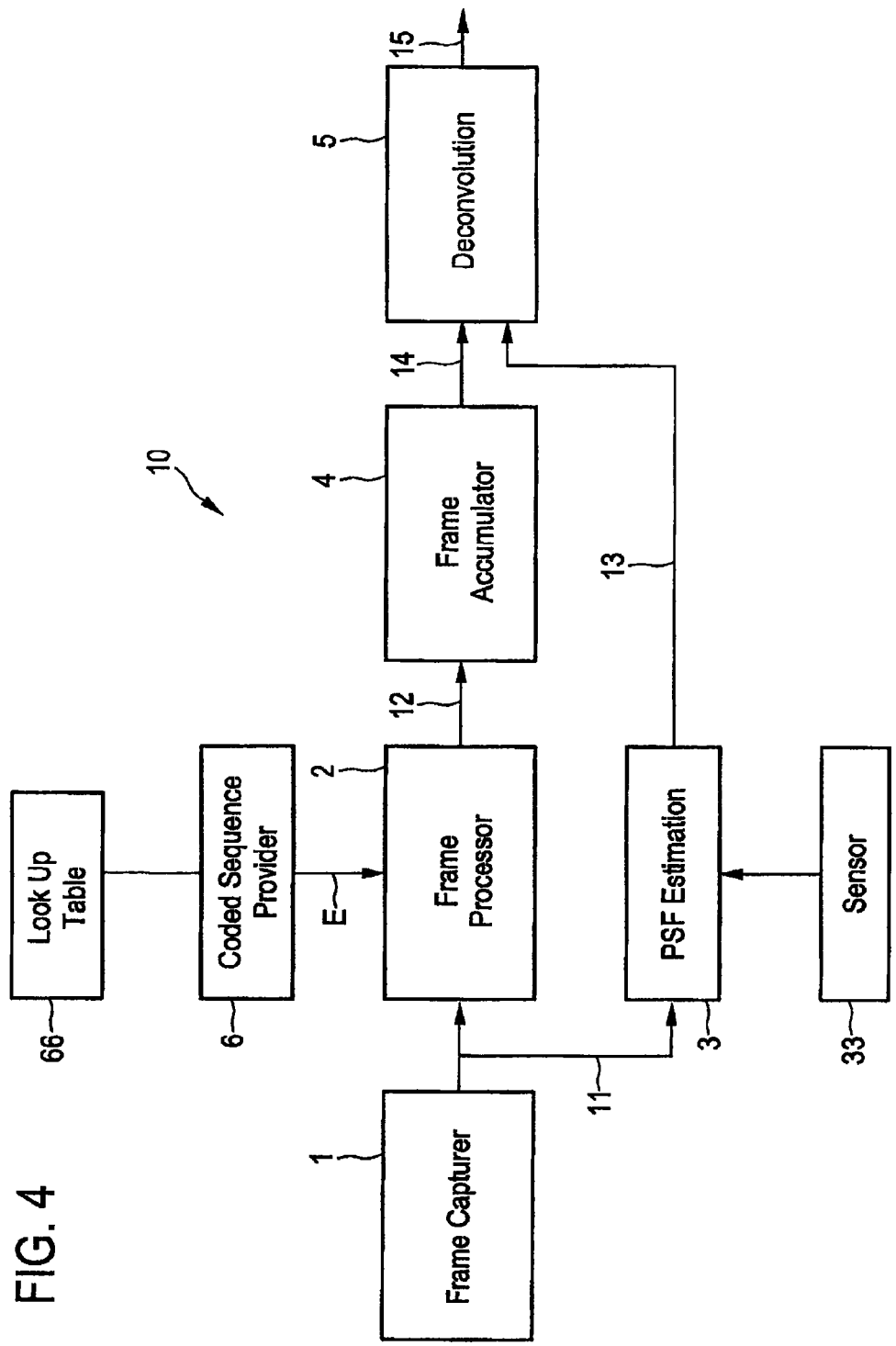
FIG. 4 shows a schematic block diagram of a system according to the present invention.

A block diagram of the system according to the present invention is shown in FIG. 4. The system 10 comprises a frame capturer 1, which is adapted to capture n frames, n being an integer number larger than 1. In the present invention the frames can be captured by using any type of camera without taking into consideration the shutter control functionality or any other hardware changes for example the image can be captured by using any camera with burst short mode (having a safe shutter speed) or video capture functionality. According to the present invention an image frame can comprise a complete image or can also be a part of an image. The term image as used in the present application can be a still image or can be one image within a sequence of moving images constituting a video.

The captured frames 11 are then submitted to a frame processor 2 and to a PSF estimation unit 3. The PSF estimation unit 3 hereby estimates the Point Spread Function and submits the Point Spread Function 13 to the deconvolution unit 5. The PSF estimation unit hereby can use any known PSF estimation method. In a preferred embodiment the PSF estimation unit estimates the points spread function based on motion estimation and/or on data submitted by a motion measurement sensor 33, such as for example motion measurement sensors 33 for gyroscopes, accelerometers or the like.

From all frames which were captured by the frame capturer 1 the frame processor 2 processes each frame by subsequently associating a value of coded sequence E which is submitted by a sequence provider 6 to each of the captured frames. The frame processor 2 thereby accomplishes a selection of frames to be kept or dropped and/or accomplishes a weighting of the captured frames. The function of the sequence provider 6 and the frame processor 2 will be explained in detail later on.

The coded sequence provided by the coded sequence provider 6 can be determined dynamically based on the actual settings and/or image properties or, in order to reduce the processing amount, a look-up-table 66 can be provided having stored therein different coded sequences, which can be selected depending on the actual needs.

The processed frames 12, i.e. the kept and/or weighted frames, are submitted to the frame accumulator 4, which accumulates all processed frames according to a predefined scheme, which will also be explained later on. The frame accumulator 4 then submits the accumulated frame 14 to the deconvolution unit 5, which carries out deconvolution on the accumulated frame 14 in accordance with the Point Spread Function 13 submitted by the Point Spread Function estimation unit 3.

The final deblurred image 15 is then output by the deconvolution unit 5. According to the present invention after the deconvolution further types of image correction or processing can be provided.

Figure 5:
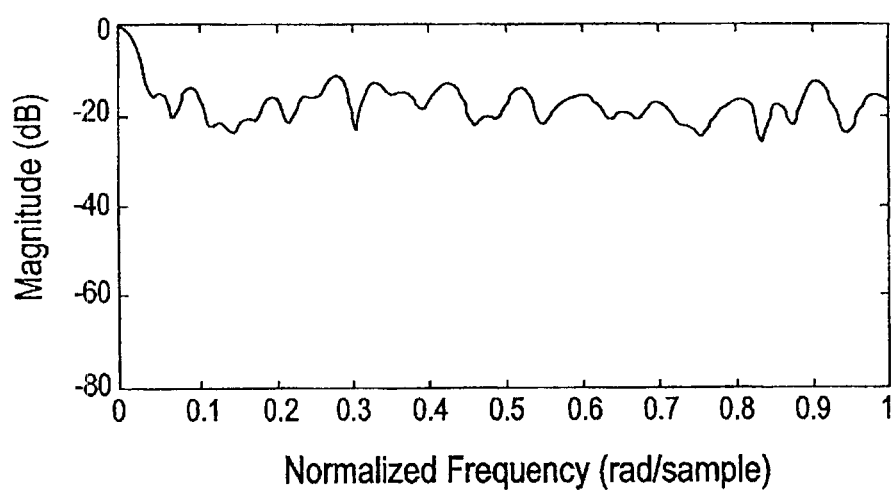
FIG. 5 shows a frequency spectrum of the PSF obtained with the method according to the present invention.

The frequency spectrum obtained using the proposed frame processing approach is shown in FIG. 5. As can be seen with the proposed techniques there are no zeros in the spectrum and the high spatial frequencies are retained and an optimal deblurred image is achieved.

Figure 6:
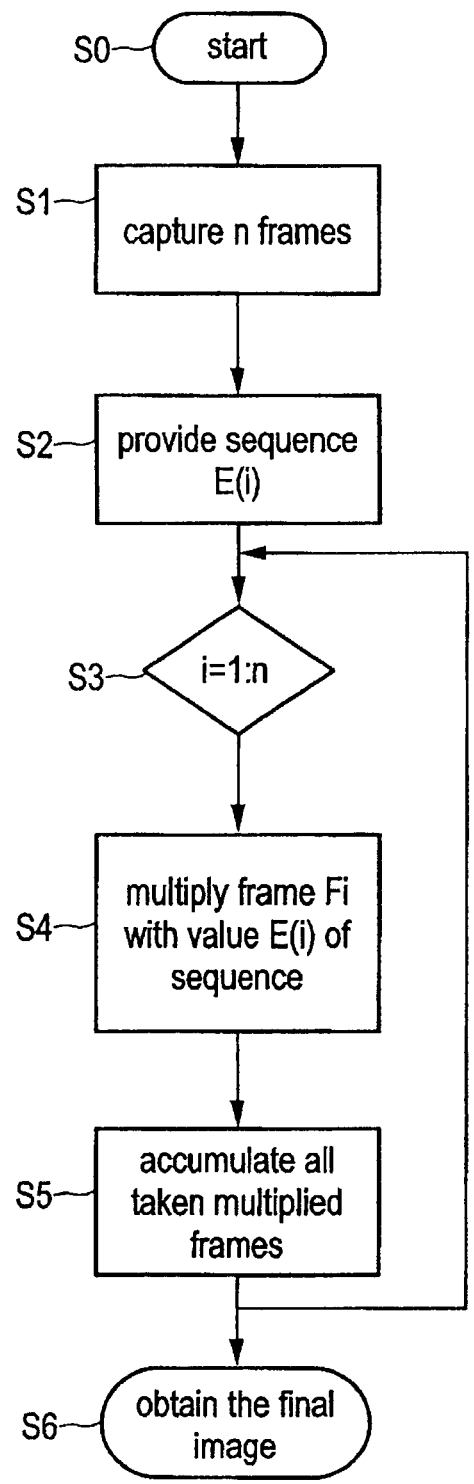
FIG. 6 shows a flow chart with process steps according to the method of a first embodiment of the present invention.
Figure 7:
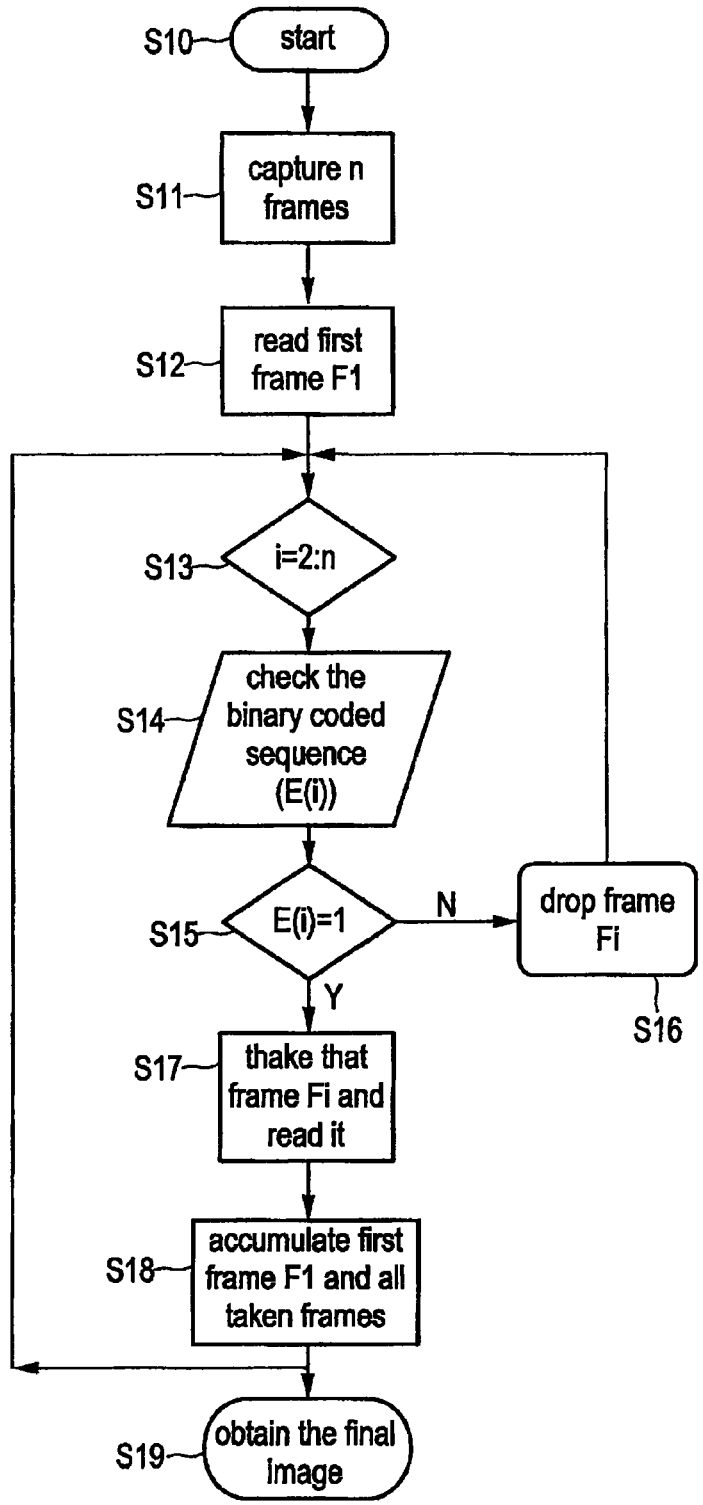
FIG. 7 shows a flow chart with the process steps according to a second embodiment of the present invention.

In the following a first embodiment of the present invention will be explained in more detail with reference to FIG. 6. In this first embodiment, each captured frame is multiplied with one sequence value, i.e. each pixel of the frame is multiplied. Depending on the sequence values, the multiplied frame is dropped (in case of a 0 in the sequence), the multiplied frame is kept unchanged (in case of a 1 in the sequence) or the multiplied frame is kept with a different weighting (in case of any value other than 0 or 1 in the sequence).

The process starts in step S0. In the following step S1 n frames are captured by the frame capturer 1.

In step S2 the sequence E(i) is provided by the sequence provider 6. The sequence E comprises a number of values being equal to or larger than the number of captured frames, so that each captured frame has an allocated value. However, it is also possible to provide a sequence with less values than captured frames and to use the same sequence more than once on the captures frames.

In one embodiment the sequence E comprises continuous values, which can for example be rational values being equal to, larger than or smaller than 1. The sequence can comprise a 0 or can comprise no 0. In case that a 0 is provided, then the corresponding frame, which is multiplied by 0 is not processed any further, i.e. the corresponding frame is dropped.

The sequence E can for example comprise arbitrary values between 0 and 1, so by multiplication of a frame with the corresponding values also a weighting of the frames becomes possible.

In a preferred embodiment the sequence is a binary-coded sequence comprising values 0 and 1, wherein 0 indicates that a frame $F_i$ should be dropped and 1 indicates that a frame $F_i$ should be kept.

However, the present invention is not limited to the above defined sequences, but can comprise any other type of sequence allowing a dropping and/or weighting of captured frames.

In the next step S3 a repetitive process starts, i.e. a process which is repeated for all captures frames $F_i$. In step S4 each frame $F_i$ is subsequently multiplied with the value E(i) of the sequence, thereby obtaining m multiplied frames $F_j$, j=1, ... m, whereby m is equal to or smaller than n, which is the number of captured image frames.

It is clear that with a 0 within the sequence the corresponding frame will be dropped. Likewise, when providing several different values within the sequence, the frames can be weighted.

In the next step the multiplied captured frames are accumulated, which will be explained in detail later on.

The final image in step S6 is then obtained by applying a deconvolution to the accumulated frame.

Now, a second embodiment of the present invention will be explained. In this embodiment the frames are not multiplied by the sequence values, but the sequence values are used as indicator or flag for deciding on the type of processing the captured frames. In a preferred embodiment the sequence comprises values of 0 and 1, so that with the sequence it is defined whether a frame should be dropped or kept.

The process starts in step S10. In the following step S11 n frames are captured by the frame capturer 1.

According to the preferred embodiment of the present invention the first frame $F_1$ is always kept and thus in the following step S12 the first frame $F_1$ is read.

As already explained the sequence E defines whether a captured image frame should be dropped or kept. In a preferred embodiment the sequence comprises a number of symbols being equal to or more than the number of captured frames, so that to each frame one symbol can be allocated. Depending on the type of symbol it is determined whether the corresponding frame should be kept or dropped.

In one embodiment the sequence is a binary-coded sequence comprising symbols 0 and 1, wherein 0 indicates that a frame should be dropped and 1 indicates that a frame should be kept.

This coded sequence E according to the present invention thus can be defined as $E(i) \in \{0;1\}$ for all $i=1, \ldots n$ That means that E is a sequence where a symbol is allocated to each frame. In case that a 0 is allocated to a frame then this frame is dropped and if a 1 is allocated to a frame then this frame is kept.

However, the present invention is not limited to the binary-coded sequence, but can use any other type of sequence comprising arbitrary types of symbols. These symbols are recognized as indicator or flag by the frame processor 2 and the frames are processed accordingly. Hereby, any relation between sequence values and processing steps is possible.

After the first frame $F_1$ is read and kept then in the following step S13 a repetition starts for all following frames i running from frame 2 to frame n.

In the next step S14 the binary-coded sequence E(i) is checked and in the next step S15 for the frame currently under consideration it is checked whether the coded sequence equals to 1. If this is not the case, i.e. the sequence equals to 0 then the corresponding frame $F_i$ is dropped in step S16 and the process continues in step S3 with the next frame.

Otherwise if in step S15 it is found that the sequence E(i) equals to 1, then in the following step S17 the frame currently under consideration is kept and read.

In step S18 the first frame $F_1$ and all kept frames are accumulated.

If all frames have been either dropped or kept and after the accumulation then in step S19 the final image is obtained.

Now, the process of accumulating will be explained in more detail. For accumulating the frames, different mechanisms are possible. One mechanism is to wait until all frames have been processed and then to calculate the sum of all processed captured frames and to divide the sum by the number of processed frames.

To make it more clear, the first accumulation method for accumulating p processed frames obtains the accumulated frame $F_A$ by $$F_A = \left(\sum_{i=1}^{p} F_i\right) \Big/ p$$

Another possibility would be to recursively determine the accumulated frame by summing up the first processed frame and a predefined number of subsequent processed frames and dividing the sum by the number of summed up frames. With this step a first intermediate frame is obtained and this intermediate frame again is summed up with a predefined number of subsequent processed frames and divided by the number of summed up framed in order to obtain a second intermediate frame and this step is repeated until all frames have been accumulated.

With the proposed technique, any camera having burst shot mode or any video camera can be used to capture an image according to the coded sequence without any external hardware requirements and constraints and without any trigger mode requirements. Additional external hardware or camera with a special trigger mode is no more required.

With the proposed technique PSF can be estimated by using motion estimation or by using motion measurement sensors for e.g. gyroscopes, accelerometers etc. Thereby it is still possible to use the coded sequence according to the present invention. Further, the PSF estimation according to the present invention is thereby more robust compared to known methods. Specifically, no blind PSF estimation has to be carried out.

With the proposed technique the coded sequence can be optimized according to the actual settings and/or the contents of the image. The coded sequence can e.g. be based on the width of the object. If the object is for example only one pixel thick, then the coded sequence can be optimized to obtain a minimum smearing. On the other hand, if the object is several pixels thick, then the coded sequence can be optimized to preserve the thicker object.

Also the noise to gain properties, the luminance setting or the like can be used to adapt the coded sequence.

The present system, method and computer program product can specifically be used when displaying images in non-stroboscopic display devices, in particular Liquid Crystal Display Panels (LCDs), Thin Film Transistor Displays (TFTs), Color Sequential Displays, Plasma Display Panels (PDPs), Digital Micro Mirror Devices or Organic Light Emitting Diode (OLED) displays.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for reducing motion blur comprising the steps of:
   capturing at least two image frames;
   providing a sequence of values by estimating a point spread function based on motion estimation or based on data submitted by motion measurement sensors;
   processing each captured frame by subsequently associating one sequence value to each captured frame and defining, on the basis of the sequence values, whether a captured frame should be dropped or kept;
   accumulating all captured processed frames; and
   applying a deconvolution to the accumulated frame.

2. The method according to claim 1, wherein the processing further comprises weighting by the sequence values the captured frames.

3. The method according to claim 1, wherein the sequence comprises a number of values being equal to or larger than the number of captured frames, each frame having an allocated value.

4. The method according to claim 1, wherein the sequence comprises continuous values.

5. The method according to claim 1, wherein the sequence comprises rational values being equal to or smaller than 1.

6. The method according to claim 1, wherein the step of processing comprises subsequently multiplying each captured frame with one sequence value.

7. The method according to any of claim 1, wherein the sequence is a binary-coded sequence comprising values 0 and 1, and wherein 0 indicates that a frame should be dropped and 1 indicates that a frame should be kept.

8. The method according to claim 1, wherein for accumulating all processed frames are summed up and divided by the number of summed frames.

9. The method according to claim 1, comprising keeping the first frame.

10. The method according to claim 9, wherein for accumulating the first image frame and a predefined number of subsequent processed frames are summed up and divided by the number of summed frames, thereby obtaining an intermediate frame.

11. The method according to claim 10, wherein for accumulating each previously obtained intermediate frame and a predefined number of subsequent processed frames are summed up and divided by the number of summed frames until a final accumulated frame is obtained.

12. The method according to claim 1, further comprising the step of dynamically generating the sequence based on at least one of the actual settings and the image content.

13. The method according to claim 1, further comprising the step of selecting a sequence stored in a look up table based on at least one of the actual settings and the image content.

14. A system for reducing motion blur, comprising:
    a frame capturer for capturing at least two image frames;
    a sequence provider for providing a sequence of values from a point spread function estimation unit for estimating the point spread function based on motion estimation or based on data submitted by motion measurement sensors;
    a frame processor for processing each captured frame by subsequently associating one sequence value to each captured frame, wherein the frame processor is configured to define, on the basis of the sequence values, whether a captured frame should be dropped or kept;
    a frame accumulator for accumulating all captured processed frames; and
    a deconvolution unit for applying a deconvolution to the accumulated frame.

15. The system according to claim 14, wherein the frame processor is configured to weigh the captured frames by the sequence values.

16. The system according to claim 14, wherein the sequence provider provides a sequence comprising a number of values being equal to or larger than the number of captured frames, each frame having an allocated value.

17. The system according to claim 14, wherein the sequence provider provides a sequence comprising continuous values.

18. The system according to claim 14, wherein the sequence provider provides a sequence comprising rational values being equal to or smaller than 1.

19. The system according to claim 14, wherein the frame processor subsequently multiplies each captured frame with one sequence value.

20. The system according to claim 14, wherein the sequence provider provides a binary-coded sequence comprising values 0 and 1, and wherein 0 indicates that a frame should be dropped and 1 indicates that a frame should be kept.

21. The system according to claim 14, wherein the frame accumulator for accumulating calculates the sum of all processed frames and divides the sum by the number of summed frames.

22. The system according to claim 14, wherein the frame accumulator keeps the first frame.

23. The system according to claim 22, wherein the frame accumulator for accumulating calculates the sum of the first image frame and a predefined number of subsequent processed frames and divides the sum by the number of summed frames, thereby obtaining an intermediate frame.

24. The system according to claim 23, wherein the frame accumulator for accumulating repeats the calculating of the sum of each previously obtained intermediate frame and a predefined number of subsequent processed frames and divides the sum by the number of summed frames, until a final accumulated frame is obtained.

25. The system according to claim 14, wherein the sequence provider is configured to dynamically generate the sequence depending on the actual setting and/or the image content.

26. The system according to claim 14, wherein the sequence provider is configured to select a sequence stored in a look up table depending on the actual setting and/or the image content.

27. A device, including a still camera having burst shot mode or a video camera, comprising a system according to any one of claims 14-20 or 21-26 inclusive.

28. A system for reducing motion blur comprising:
   means for capturing at least two image frames, by estimating a point spread function based on motion estimation or based on data submitted by motion measurement sensors;
   means for providing a sequence of values;
   means for processing each captured frame by subsequently associating one sequence value to each captured frame, wherein associating comprises defining, on the basis of the sequence values, whether a captured frame should be dropped or kept;
   means for accumulating all captured processed frames; and
   means for applying a deconvolution to the accumulated frame.

29. A non-transitory computer readable medium having stored thereon a program that when executed by a computer causes the computer to execute a method comprising:
   capturing at least two image frames;
   providing a sequence of values, by estimating a point spread function based on motion estimation or based on data submitted by motion measurement sensors;
   processing each captured frame by subsequently associating one sequence value to each captured frame, wherein associating comprises defining, on the basis of the sequence values, whether the captured frame should be dropped or kept;
   accumulating all captured processed frame; and
   applying a deconvolution to the accumulated frame.

* * * * *